UNITED STATES PATENT OFFICE.

WILLIAM F. SHAW, OF BOSTON, MASSACHUSETTS.

IMPROVEMENT IN TREATING INDIA-RUBBER.

Specification forming part of Letters Patent No. 15,531, dated August 12, 1856.

*To all whom it may concern:*

Be it known that I, WM. F. SHAW, of Boston, in the county of Suffolk and State of Massachusetts, have discovered a mode of rendering fabrics of vulcanized or non-vulcanized india-rubber or gutta-percha impervious to illuminating-gas and other light gases; and I do hereby declare that the following is a full and exact description thereof.

The nature of my discovery lies in the application of raw or boiled linseed-oil in a heated state to articles formed of vulcanized india rubber or gutta-percha, also heated, by which any excess of sulphur contained in the fabrics may be combined with the oil to form at the place of application an elastic compound of oil and sulphur impervious to air and gases, yet allowing of bending and stretching.

It is well known that pipes formed of vulcanized india-rubber and gutta-percha permit illuminating-gas to traverse and escape through their substance. I have found that this is owing to pores produced by sulphur in a more or less crystalline state tending toward the surface. Now, when these pores are once filled with varnish or glue the sulphur still continues to exude, more pores are formed, and the pipe becomes useless. My experiments have resulted in demonstrating the fact that linseed or other siccative oil heated to the boiling-point of water, or higher, not only enters the pores, but combines chemically with the sulphur, and the resulting compound is elastic and free from tuckiness when dry. It is also insoluble in illuminating-gas, hydrogen gas, and mixtures of carbonic oxide with these gases. Hence pipes thus impregnated with these oils become not only useful, but the offensive odor of sulphur and rubber which they previously had is neutralized or destroyed in the combination of oil and sulphur. I find, also, that it is essential that sulphur be present for the oil to combine with, for although oil in which sulphur has been heated may be used to protect india-rubber pipes and fabrics which have not been vulcanized, it is better that the compound of oil and sulphur should be formed by heat in the fabric containing sulphur.

To enable others to apply my discovery, I will proceed to describe my mode of preparing vulcanized india-rubber or gutta-percha pipe or fabrics.

Sufficient linseed or other siccative oil must be heated in a vessel by steam or fire so that its temperature shall be above 212° Fahrenheit and not above 550° Fahrenheit, and through this, by immersion, the pipes or fabrics are slowly drawn. In the case of a pipe its end is immersed and passed slowly through the heated oil, and if bubbles appear the pipe is retained until they rise from it. Both inside and outside are thus exposed to the oil, which penetrates in and seizes the sulphur. Fabrics are to be treated in the same way, the excess of oil being drained or wiped off. The goods must be hung up in a warm atmosphere until their surfaces cease to be tacky. Thin goods in this way are rendered very permanent, for the compound formed of oil and sulphur prevents the after destructive effect of the sulphur on the rubber, and gas-bags and other articles are thus protected.

I am aware that varnishes and lacquers have been applied to rubber goods to produce a glossy surface by laying on solutions of bituminous resins and metallic or oxide paints. This I disclaim, confining myself to the use of oils known as "siccative oils," applied so as to combine with the sulphur present in vulcanized india-rubber and gutta-percha goods, or by first combining sulphur with siccative oils for goods not vulcanized, so as to prevent the escape or penetration of gases into and through the fabric.

What I claim as my discovery, and wish to secure by Letters Patent, is—

The treatment of sulphured rubber or percha with unsulphured drying-oils, or unsulphured rubber or percha with sulphured drying-oils, in the manner set forth.

W. F. SHAW.

Witnesses:
FREDERIC ODIORNE,
E. H. GOSS.